United States Patent
Bando

(10) Patent No.: US 10,633,278 B2
(45) Date of Patent: Apr. 28, 2020

(54) METHOD OF CUTTING OUT GLASS PLATE AND POSITIONING CUT-OUT GLASS PLATE AND APPARATUS THEREOF

(71) Applicant: BANDO KIKO CO., LTD., Tokushima-shi, Tokushima (JP)

(72) Inventor: Kazuaki Bando, Tokushima (JP)

(73) Assignee: BANDO KIKO CO., LTD., Tokushima-shi, Tokushima (JP)

( * ) Notice: Subject to any disclaimer, the term of this patent is extended or adjusted under 35 U.S.C. 154(b) by 197 days.

(21) Appl. No.: 15/549,654

(22) PCT Filed: May 26, 2016

(86) PCT No.: PCT/JP2016/002544
§ 371 (c)(1),
(2) Date: Aug. 8, 2017

(87) PCT Pub. No.: WO2016/199365
PCT Pub. Date: Dec. 15, 2016

(65) Prior Publication Data
US 2018/0044220 A1    Feb. 15, 2018

(30) Foreign Application Priority Data

Jun. 10, 2015  (JP) .................................. 2015-117872

(51) Int. Cl.
*C03B 33/03* (2006.01)
*B28D 1/22* (2006.01)
(Continued)

(52) U.S. Cl.
CPC ............... *C03B 33/03* (2013.01); *B28D 1/22* (2013.01); *B28D 5/023* (2013.01); *B65G 49/064* (2013.01);
(Continued)

(58) Field of Classification Search
None
See application file for complete search history.

(56) References Cited

U.S. PATENT DOCUMENTS

2005/0229755 A1  10/2005  Okajima et al.
2007/0164072 A1*  7/2007  Nishio ................. B28D 5/0011
225/93.5
(Continued)

FOREIGN PATENT DOCUMENTS

CN   1678439 A    10/2005
JP   3005276      10/1994
(Continued)

OTHER PUBLICATIONS

International Search Report for PCT/JP2016/066798 dated Aug. 16, 2016, 4 pages.
(Continued)

*Primary Examiner* — Lisa L Herring
(74) *Attorney, Agent, or Firm* — Nixon & Vanderhye P.C.

(57) ABSTRACT

A cut-out glass plate positioning apparatus includes: a cut line forming device 4 provided in a cut line forming position 4a; a bend-breaking and separating device 6 for cutting out unworked plate glasses 5 from an unworked plate glass 2 along the cut lines 3; a pair of position and angle correcting devices 8 for effecting correction of the position and angle with respect to the unworked plate glass 5; a pair of sucking and transporting devices 9 for suckingly lifting and transporting the unworked plate glass 5 to each position and angle correcting device 8; and two CCD cameras 10 respectively installed above the position and angle correcting devices 8.

5 Claims, 9 Drawing Sheets

(51) Int. Cl.
  *G05B 19/401* (2006.01)
  *B65G 49/06* (2006.01)
  *C03B 33/027* (2006.01)
  *C03B 33/037* (2006.01)
  *B28D 5/02* (2006.01)
  *G05B 19/4093* (2006.01)

(52) U.S. Cl.
  CPC .......... *C03B 33/027* (2013.01); *C03B 33/037* (2013.01); *G05B 19/401* (2013.01); *G05B 19/40932* (2013.01); *B65G 2249/04* (2013.01); *B65G 2249/045* (2013.01); *G05B 2219/50033* (2013.01)

(56) References Cited

U.S. PATENT DOCUMENTS

| | | | |
|---|---|---|---|
| 2007/0281444 A1 | 12/2007 | Nishio et al. | |
| 2008/0158482 A1 | 7/2008 | Jang et al. | |
| 2008/0305615 A1* | 12/2008 | Ueno | B28D 5/0011 438/463 |
| 2011/0095062 A1* | 4/2011 | Maekawa | C03B 33/033 225/2 |
| 2015/0225284 A1* | 8/2015 | Minami | B28D 1/14 700/157 |

FOREIGN PATENT DOCUMENTS

| | | |
|---|---|---|
| JP | 7-040247 | 2/1995 |
| JP | 9-124330 | 5/1997 |
| JP | 2001-261357 | 9/2001 |
| JP | 2008-85275 A | 4/2008 |
| JP | 2012-092010 | 5/2012 |
| WO | WO 2012/039007 | 3/2012 |

OTHER PUBLICATIONS

First Office Action dated Apr. 24, 2019 in Chinese Application No. 201680009152.5, with English translation, 13 pages.
International Search Report for PCT/JP2016/002544 dated Aug. 16, 2016, 4 pages.
Extended European Search Report dated Dec. 20, 2018 in European Application No. 16807082.9 (6 pages).

* cited by examiner

METHOD OF CUTTING OUT GLASS PLATE AND POSITIONING CUT-OUT GLASS PLATE AND APPARATUS THEREOF

This application is the U.S. national phase of International Application No. PCT/JP2016/002544 filed May 26, 2016 which designated the U.S. and claims priority to JP 2015-117872 filed Jun. 10, 2015, the entire contents of each of which are hereby incorporated by reference.

TECHNICAL FIELD

The present invention relates to a method of cutting out a glass plate and positioning the cut-out glass plate and an apparatus thereof.

Further, the present invention concerns a method of cutting out a multiplicity of small divided unworked plate glasses from a large-size unworked plate glass and sequentially positioning the cut-out unworked plate glasses and an apparatus thereof.

BACKGROUND ART

Conventionally, the positioning of a small divided unworked plate glass is generally effected by pressing peripheral edges of the small divided unworked plate glass against stopper rollers disposed at a plurality of necessary positions.

PRIOR ART DOCUMENTS

Patent Documents

Patent Document 1: JP-A-9-124330
Patent Document 2: JP-A-2001-261357

SUMMARY OF THE INVENTION

Problems that the Invention is to Solve

In the positioning of the small divided unworked plate glass by abutting against the stopper rollers, variations occur depending on the condition of the shape of the bend-broken edge of the unworked plate glass, the degree of wear of the rollers, the form of pressing against the rollers, and the degree of the pressing force. Particularly in cases where an edge portion between the peripheral edge of the small divided unworked plate glass and a cut line to be formed on the small divided unworked plate glass is required to be zero or minimal as in recent years, or in the case where accurate grinding of the peripheral edge of the small divided unworked plate glass is required, a decline in the positioning accuracy and the variation in positioning result in cut line forming and bend-breaking failure or peripheral edge grinding failure, resulting in the loss of the small divided unworked plate glasses.

The present invention has been devised in view of the above-described aspects, and its object is to provide a method of cutting out a glass plate and positioning the cut-out glass plate and an apparatus thereof, which make it possible to avoid cut line forming and bend-breaking failure or peripheral edge grinding failure and do not cause a loss of cut-out glass plates which are small divided unworked plate glasses.

Means for Solving the Problems

A method of cutting out a glass plate and positioning the cut-out glass plate in accordance with the present invention comprises the steps of: forming cut lines on an unworked plate glass with a preset work coordinate system in a cut line forming position with respect to the unworked plate glass; applying an alignment mark onto at least two locations set in advance in the work coordinate system on each of a plurality of glass plates to be cut out from the unworked plate glass, before forming the plurality of cut-out glass plates cut out from the unworked plate glass along the cut lines; detecting the position of an actual alignment mark on the cut-out glass plate by performing imaging and image processing of the alignment mark with a camera installed by setting as a reference position a coordinate value of the alignment mark set in the work coordinate system, in a positioning position for positioning the glass plate with the alignment mark applied thereto and cut out; calculating an amount of positional deviation between the position of the actual alignment mark and the reference position; and correcting a position and an angle of the cut-out glass plate on the basis of the amount of positional deviation.

Further, another method of cutting out a glass plate and positioning the cut-out glass plate in accordance with the present invention comprises the steps of: forming cut lines on an unworked plate glass with a scribe head by moving the scribe head under numerical control along a glass plate surface of the unworked plate glass in an X-Y coordinate plane in a preset work coordinate system; applying an alignment mark onto at least two locations set in the work coordinate system on each of a plurality of glass plates to be cut out from the unworked plate glass, before forming the plurality of cut-out glass plates cut out from the unworked plate glass along the cut lines; detecting the position of an actual alignment mark on the cut-out glass plate by performing imaging and image processing of the alignment mark by a camera installed by setting as a reference position a coordinate value of the alignment mark set in the work coordinate system, in a positioning position for positioning the glass plate with the alignment mark applied thereto and cut out; calculating an amount of positional deviation in an X-Y plane between the position of the actual alignment mark and the reference position; and correcting a position and an angle of the cut-out glass plate in the X-Y plane on the basis of the amount of positional deviation.

Still another method of cutting out a glass plate and positioning the cut-out glass plate in accordance with the present invention comprises the steps of: forming cut lines on an unworked plate glass with a preset work coordinate system in a cut line forming position with respect to the unworked plate glass; applying an alignment mark onto at least one location set in advance in the work coordinate system on each of a plurality of glass plates to be cut out from the unworked plate glass, before forming the plurality of cut-out glass plates cut out from the unworked plate glass along the cut lines; detecting an actual alignment mark on the cut-out glass plate by performing imaging and image processing of the alignment mark with a camera installed by setting as a reference position a coordinate value of the alignment mark set in the work coordinate system, in a positioning position for positioning the glass plate with the alignment mark applied thereto and cut out; and correcting a position and an angle of the cut-out glass plate on the basis of the position and form of the detected actual alignment mark and the reference position and the form of the applied alignment mark.

An apparatus for effecting the cutting out of a glass plate and the positioning of the cut-out glass plate in accordance with the present invention comprises: a cut line forming device having a scribe head which moves in an X-Y coordinate plane along a plate surface of an unworked plate glass so as to form cut lines on the unworked plate glass; a mark imparting device which, before cutting out a cut-out glass plate from the unworked plate glass with the cut lines formed thereon by the scribe head, applies an alignment mark onto at least two locations in a region of the glass plate to be cut out; a cutting-out device which cuts out the cut-out glass plate from the unworked plate glass along the cut lines formed by the cut line forming device; a camera installed in a positioning position for positioning the cut-out glass plate cut out by the cutting-out device, by using as a reference position a mark coordinate value set in a work coordinate system set in the cut line forming device; and a position and angle correcting device which detects a position of an actual alignment mark by performing image processing of the alignment mark imaged by the camera, and calculates an amount of positional deviation between the detected position of the actual alignment mark and the reference position of the alignment mark, to thereby correct the position and angle of the cut-out glass plate on the basis of the amount of positional deviation.

In addition, an apparatus for effecting the cutting out of a glass plate and the positioning of the cut-out glass plate in accordance with the present invention comprises: a cut line forming device having a scribe head which moves in an X-Y coordinate plane along a plate surface of an unworked plate glass so as to form cut lines on the unworked plate glass; a mark imparting device which, before cutting out a cut-out glass plate from the unworked plate glass with the cut lines formed thereon by the scribe head, applies an alignment mark onto at least one location in a region of the glass plate to be cut out; a cutting-out device which cuts out the cut-out glass plate from the unworked plate glass along the cut lines formed by the cut line forming device; a camera installed in a positioning position for positioning the cut-out glass plate cut out by the cutting-out device, by using as a reference position a mark coordinate value specified in a work coordinate system set in the cut line forming device; and a position and angle correcting device which detects a position of an actual alignment mark by performing image processing of the alignment mark imaged by the camera, and calculates an amount of positional deviation between the detected position of the actual alignment mark and the reference position of the alignment mark, to thereby correct the position and angle of the cut-out glass plate on the basis of the amount of positional deviation.

According to one example of the method in accordance with the present invention, in the cut line forming device, the scribe head for cut line formation and the marking head device are juxtaposed on a common bracket and are made to undergo coordinate movement as an integral unit, cut lines are formed on a large-size unworked plate glass by the scribe head in a first movement, and alignment marks are applied to the large-size unworked plate glass by the marking head device in an ensuing movement. Therefore, alignment marks can be applied to accurate positions with respect to the cut line shape.

In addition, according to one example of the method in accordance with the present invention, as for the installation of the two CCD cameras in the positioning position, the work coordinate system set in the cut line forming device is shifted, alignment mark coordinate values set in the cut line forming device are set as reference positions in the positioning position, and the CCD cameras are installed at these reference positions, so that the mark position can be detected on the basis of the marked coordinate positions in the cut line forming device, and position correction and angle correction of the small divided unworked plate glasses are performed. Therefore, accurate positioning can be effected.

In the present invention, the alignment mark is preferably applied to at least two locations; however, if the alignment mark includes such a shape that makes it possible to detect the amount of angular deviation, such as a crisscross and a polygon including a triangle, the alignment mark may be applied only to at least one location, and if the alignment mark is provided on at least one location, it suffices if the camera is also installed at at least one location. In addition, the camera, or the camera as an image sensor, is preferably a CCD camera constituted by a CCD image sensor, but it is also possible to use another type of camera, such as a CMOS camera constituted by a CMOS image sensor.

In addition, in the present invention, the cut-out glass plate positioned in the positioning position is transported to an ensuing processing position, and an arrangement may be provided such that, in such an ensuing processing position, an end cut line is formed in addition to cut lines of a final shape, the cut-out glass plate is bend-broken along the cut lines of the final shape and the end cut line, and the peripheral edges of the bend-broken glass plate are subjected to grinding after bend-breaking, to thereby obtain a final glass plate product. Alternatively, in the ensuing processing position, only grinding may be provided with respect to the peripheral edges of the cut-out glass plate to thereby obtain a final glass plate product. In this case, in the cut line forming position in the preceding stage, the application of the alignment mark is effected in addition to the formation of cut lines of a final shape and the end cut line to the unworked plate glass, and the glass plate with the alignment mark applied thereon, which has been cut out by being bend-broken along the cut lines of the final shape and the end cut line in the bend-breaking position in the similarly preceding stage, is subjected to positioning in the positioning position.

In addition, in the present invention, the formation of cut lines including the end cut line, the application of the alignment mark, and the cutting out may be effected at one position.

Advantages of the Invention

According to the present invention, since the position and angle of the cut-out glass plates are corrected, it is possible to provide a method of cutting out a glass plate and positioning the cut-out glass plate and an apparatus thereof, which make it possible to avoid cut line forming and bend-breaking failure or peripheral edge grinding failure in the ensuing processing with respect to the cut-out glass plate and do not cause a loss of cut-out glass plates which are small divided unworked plate glasses.

MODE FOR CARRYING OUT THE INVENTION

Figure 1:
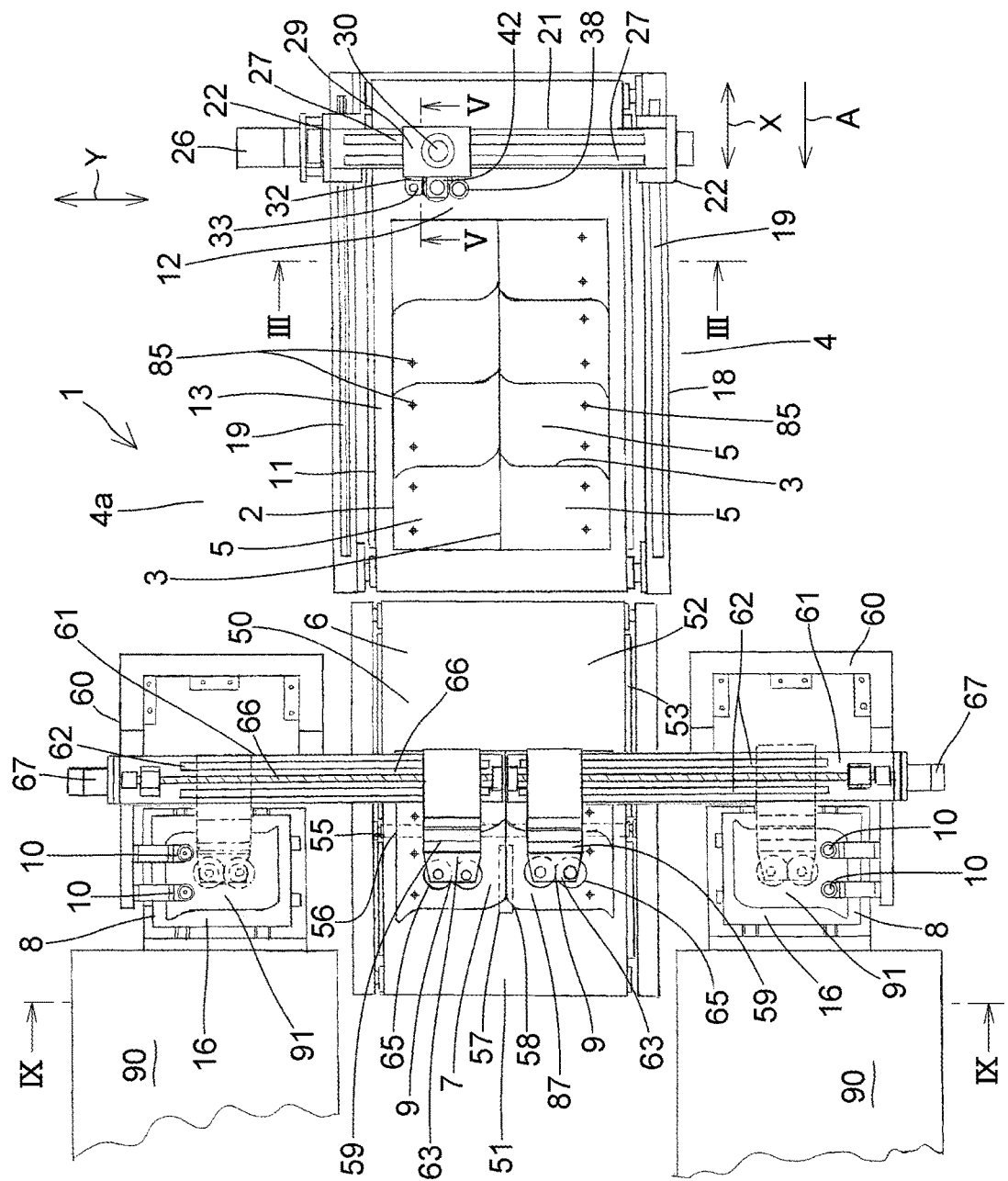
FIG. 1 is an explanatory plan view of a preferred embodiment of the present invention.

Hereafter, a detailed description will be given of the preferred embodiment of the present invention on the basis of an illustrative embodiment shown in the drawings. It should be noted that the invention is not limited to the embodiment.

Figure 2:
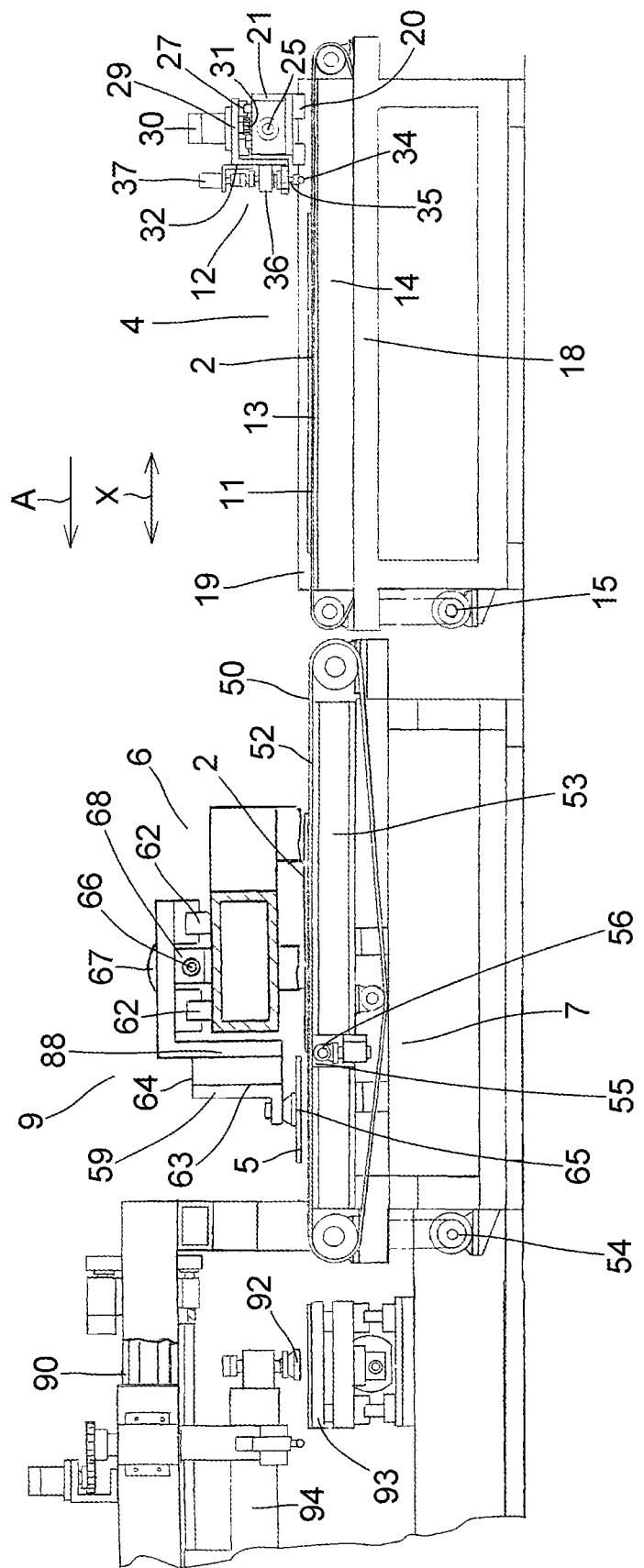
FIG. 2 is a partly sectional explanatory side elevational view of the embodiment shown in FIG. 1.
Figure 3:
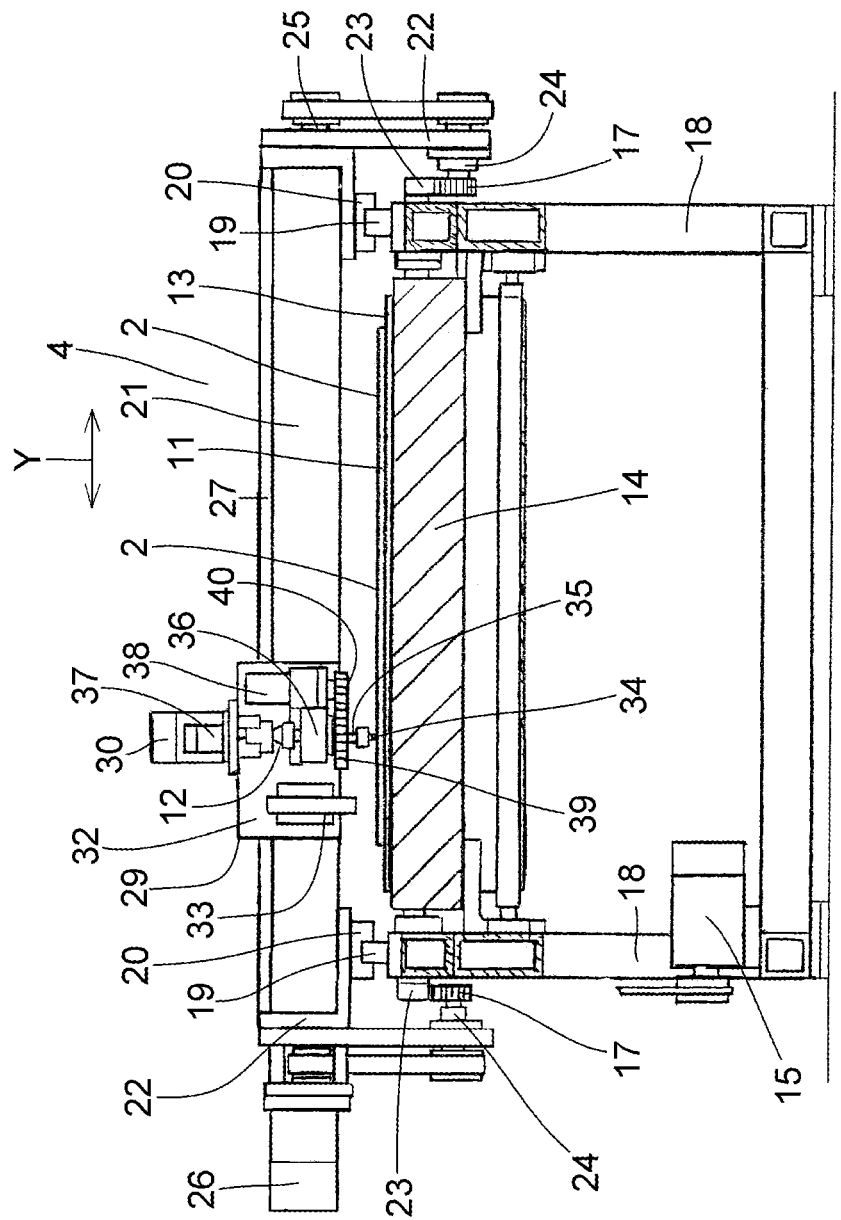
FIG. 3 is an explanatory cross-sectional view, taken in the direction of arrows along lines III-III, of the embodiment shown in FIG. 1.
Figure 4:
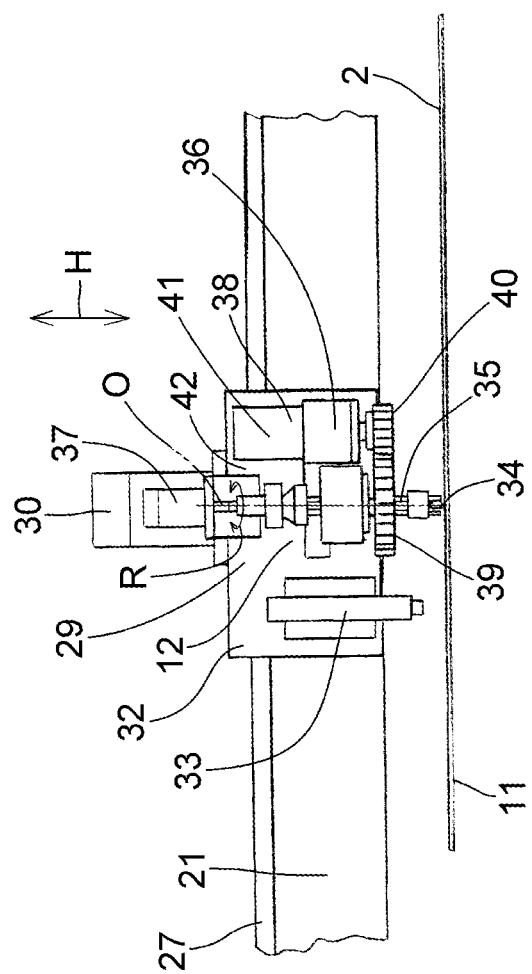
FIG. 4 is an explanatory front elevational view of a scribe head shown in FIG. 1.
Figure 5:
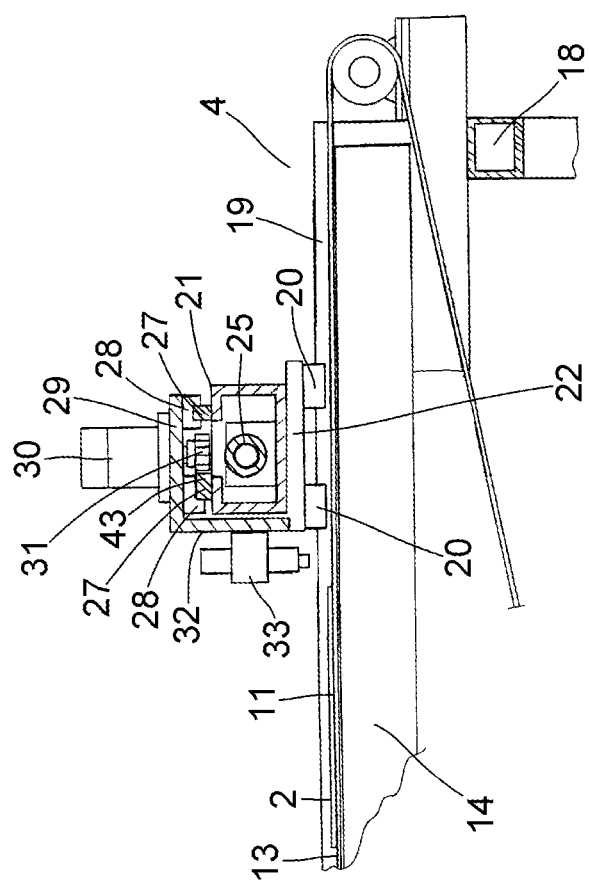
FIG. 5 is an explanatory cross-sectional view, taken in the direction of arrows along lines V-V, of the embodiment shown in FIG. 1.
Figure 6:
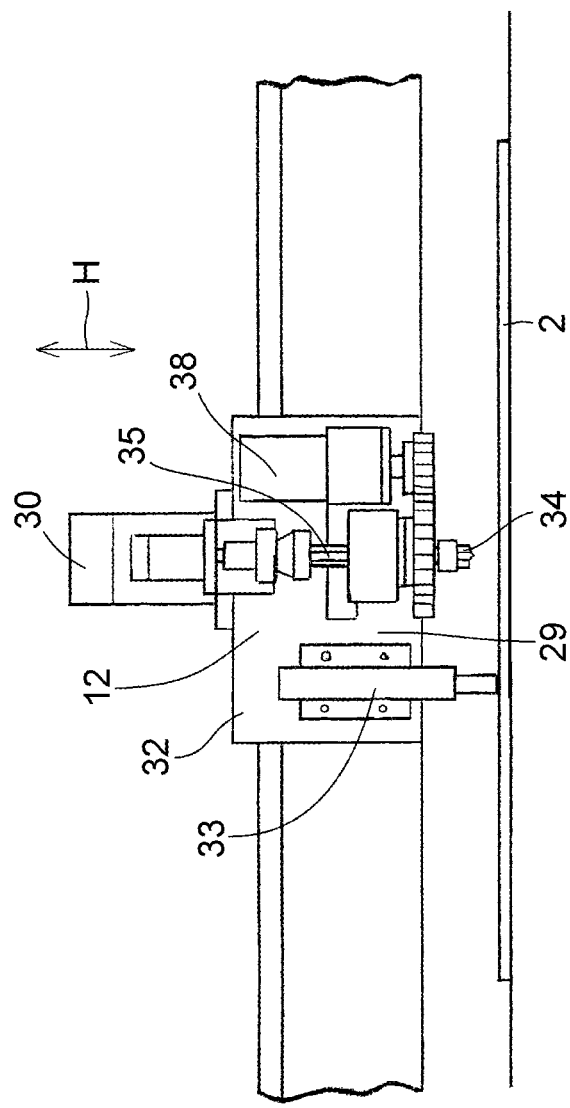
FIG. 6 is a diagram explaining the operation of marking an upper surface of a glass plate in the embodiment shown in FIG. 1.
Figure 7:
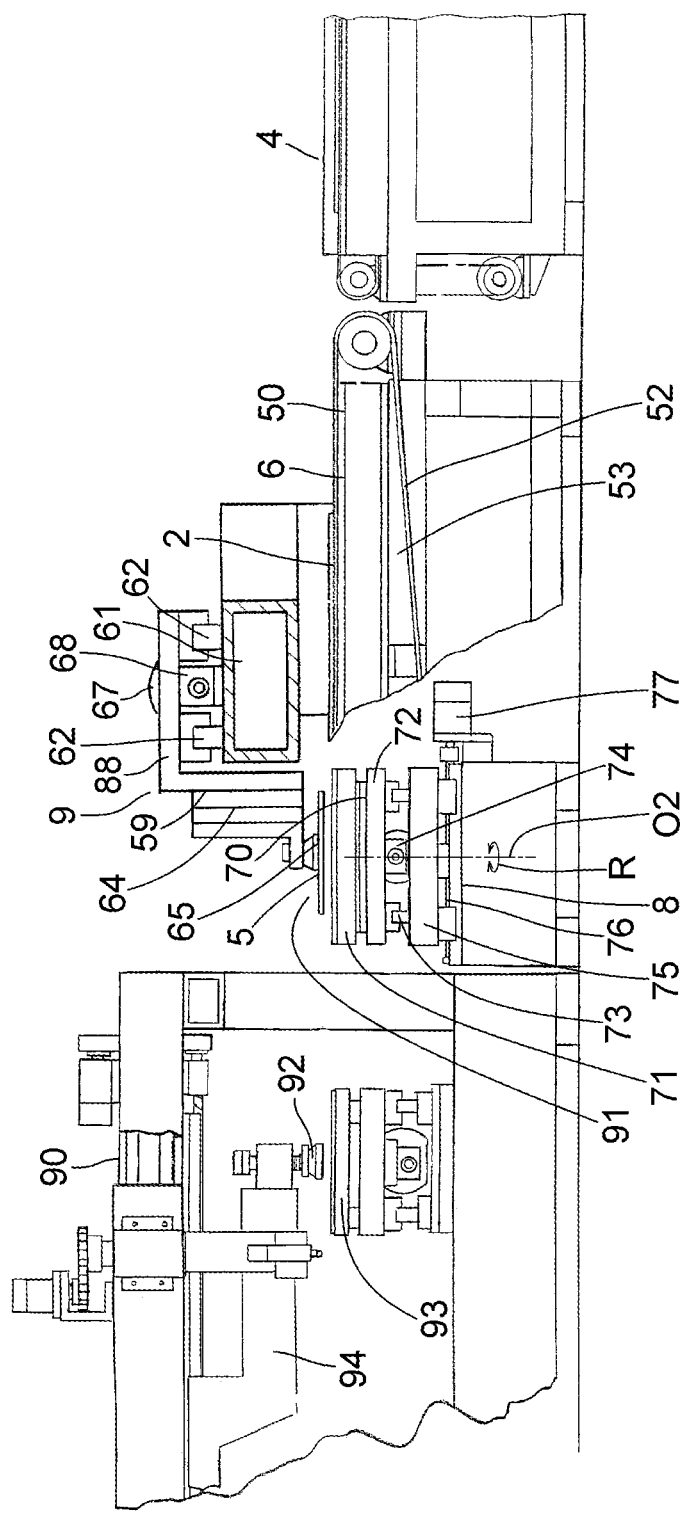
FIG. 7 is a diagram explaining a state in which a small divided unworked plate glass is being transported to a positioning position in the embodiment shown in FIG. 1.
Figure 8:
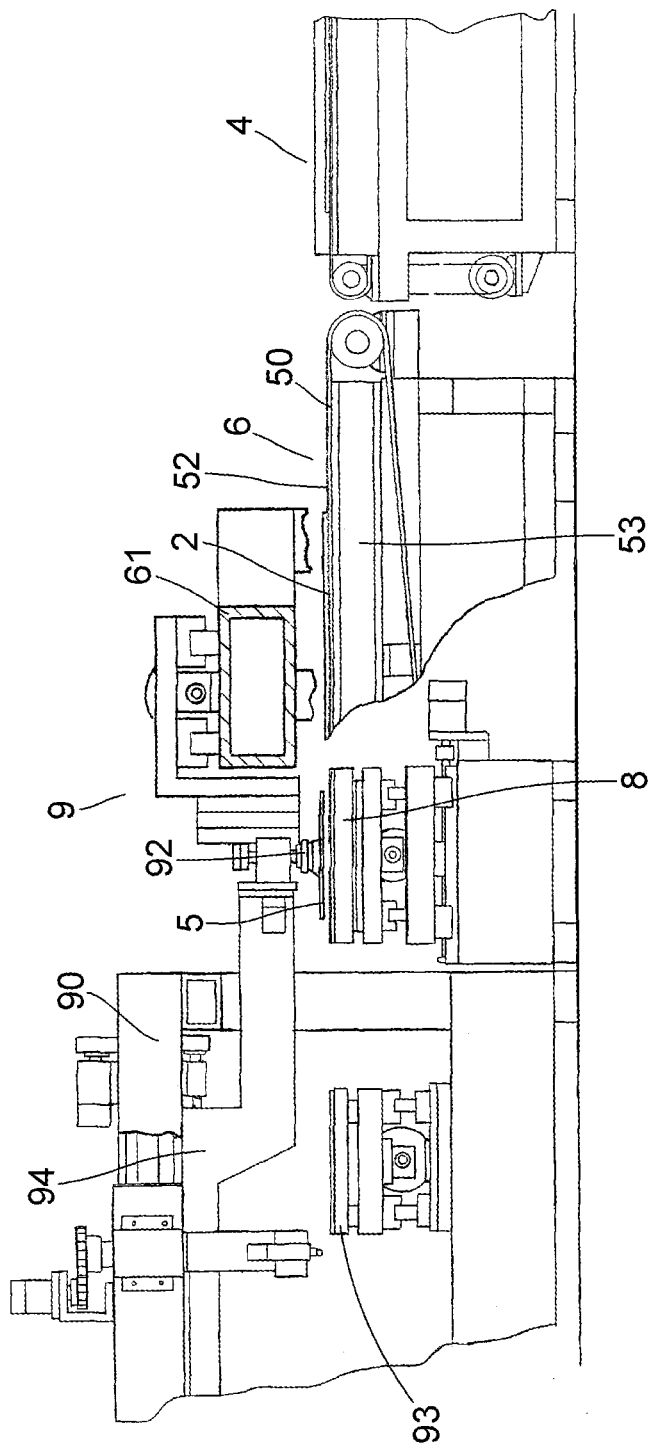
FIG. 8 is a diagram explaining a state of imaging an alignment mark on the small divided unworked plate glass by a CCD camera in the positioning position in the embodiment shown in FIG. 1.
Figure 9:
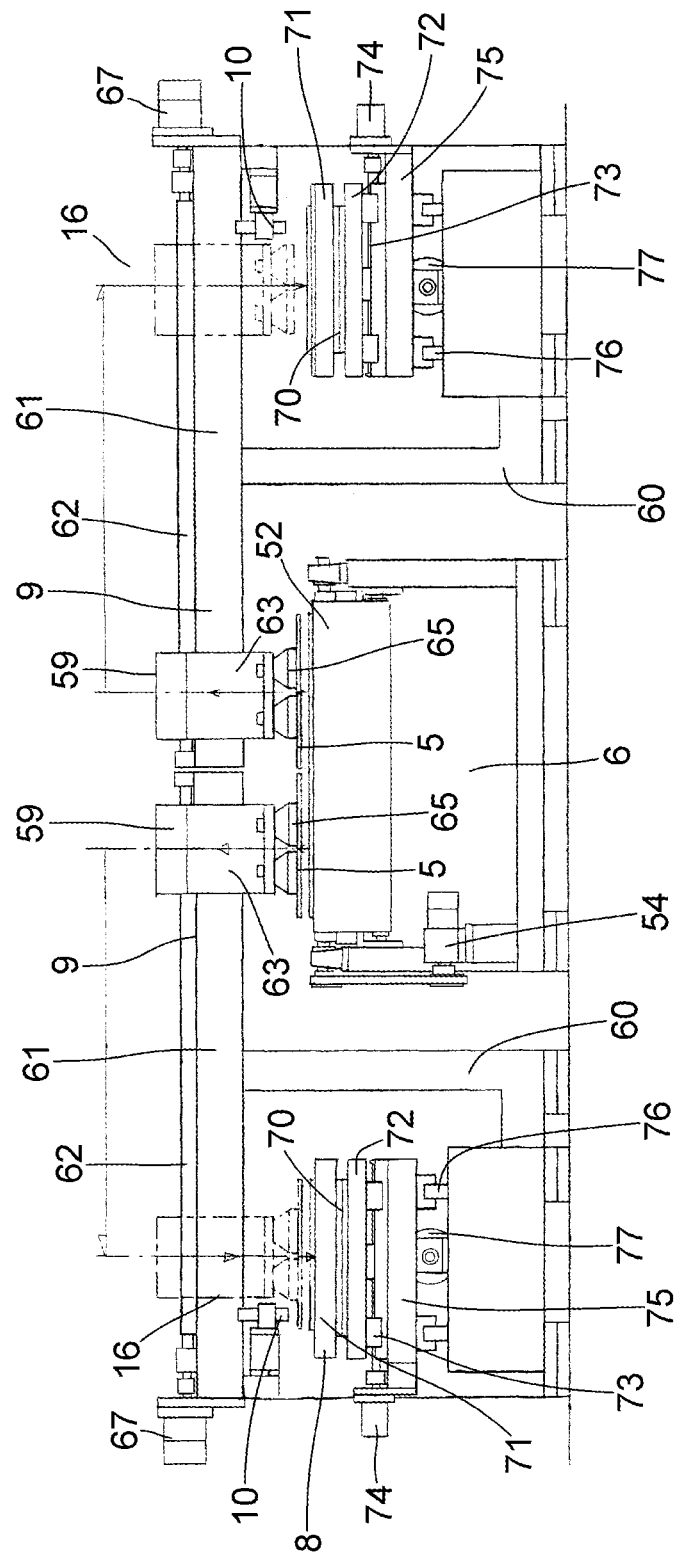
FIG. 9 is an explanatory view, taken in the direction of arrows along lines IX-IX, of the embodiment shown in FIG. 1.

In FIGS. 1 to 9, an apparatus 1 of this embodiment for effecting the cutting out of a glass plate and the positioning of the cut-out glass plate (hereafter, this apparatus will be referred to as a cut-out glass plate positioning apparatus) is comprised of: a cut line forming device 4 provided in a cut line forming position 4a so as to form cut lines 3, which are configured in the form of a multiplicity of small divided unworked plate glasses 5, on a carried-in large-size unworked plate glass 2; a bend-breaking and separating device 6, i.e., a cutting-out device, which, upon receiving the unworked plate glass 2 carried out from the cut line forming device 4 and having the cut lines 3 formed thereon, sequentially bend-breaks and separates the unworked plate glass 2 into the unworked plate glasses 5 along the cut lines 3, starting with a front end region, while inching (intermittently feeding) the unworked plate glass 2, i.e., which cuts out the unworked plate glasses 5, i.e., cut-out glass plates, from the unworked plate glass 2 along the cut lines 3 formed by the cut line forming device 4; a pair of position and angle correcting devices 8 which, upon receiving the unworked plate glass 5 from the bend-breaking and separating device 6, effects correction of the position and angle with respect to the received unworked plate glass 5; a pair of sucking and transporting devices 9 which are provided above a bend-breaking and separating position 7 in the bend-breaking and separating device 6 and the position and angle correcting devices 8, and transports the unworked plate glasses 5 to the respective position and angle correcting devices 8 while sucking and lifting them; and at least one camera 10, i.e., two CCD cameras 10 in this embodiment, respectively installed above the position and angle correcting devices 8. In each of the position and angle correcting devices 8, which is installed in a positioning position 16 which is also a feeding position 91 for each of a next pair of processing devices 90, e.g., processing devices 90 for effecting the grinding of peripheral edges of the cut-out unworked plate glasses 5, positioning including position and angle adjustment of the unworked plate glasses 5 placed on the basis of imaging by the two CCD cameras 10 and ensuing image processing operation is adapted to be carried out.

The cut line forming device 4 has a belt conveyor table 11 having a conveyor belt 13 for conveying the carried-in unworked plate glass 2 in an A direction parallel to an X-axis direction to planarly support the unworked plate glass 2 and a cut line forming means 42 having a scribe head 12 which moves in an X-Y coordinate plane parallel to the upper surface of the conveyor belt 13 above the conveyor belt 13.

The belt conveyor table 11 has, in addition to the wide conveyor belt 13, a supporting base 14 for planarly supporting from the lower side that side of the conveyor belt 13 which travels in the A direction and a drive unit 15 consisting of such as an electric motor, a pulley, and a belt for causing the conveyor belt 13 to circulatingly travel, and causes the conveyor belt 13 for transporting the unworked plate glass 2 in the A direction to travel by being driven by the electric motor of the drive unit 15 under numerical control.

A guide rail 19 is provided along the X-axis direction on each of main body frames 18 on both sides in a Y-axis direction perpendicular to the X-axis direction of the conveyor belt 13 installed along the X-axis direction on the inner side of the main body frames 18, and a slide block 20 is held on each guide rail 19 movably in the X-axis direction.

A traveling frame 21 is laid by being fixed to the slide blocks 20 through each of brackets 22 at both ends of the traveling frame 21 in the Y-axis direction in such a manner as to straddle the conveyor belt 13 above the conveyor belt 13, and the traveling frame 21 supported on the slide blocks 20 on both sides in the Y-axis direction is movable in the X-axis direction while being guided by the guide rails 19.

A rack 23 extending in the X-axis direction in parallel with the guide rail 19 is provided on each of the main body frames 18 on both sides in the Y-axis direction of the conveyor belt 13. A pinion gear unit 24 having a pinion gear 17 meshing with the rack 23 is mounted on each of the brackets 22 mounted on both sides in the Y-axis direction of the traveling frame 21.

A shaft 25 is assembled through the traveling frame 21 in such a manner as to extend rotatably through wall portions on both sides thereof and the brackets 22 in the Y-axis direction, and the shaft 25 is coupled to the pinion gear unit 24 through the pulley and belt at each end portion in the Y-axis direction. An output rotating shaft of an X-axis servo motor 26 supported on one of the brackets 22 is coupled to one end portion in the Y-axis direction of the shaft 25. Thus, the traveling frame 21 is adapted to move in the X-axis direction by the rotation of the shaft 25 and the rotation of the pinion gear 17 through the pulley and belt as the X-axis servo motor 26 is driven.

A pair of guide rails 27 are juxtaposed on the traveling frame 21 along the Y-axis direction, and a rack 43 is also juxtaposed thereon along the guide rails 27. A bracket 29 is mounted on a slide block 28 held on each of the guide rails 27 movably in the Y-axis direction, and a Y-axis servo motor 30 is mounted on the upper surface of the bracket 29 which is movable in the Y-axis direction while being guided by the pair of guide rails 27 through the slide blocks 28. A pinion gear 31 meshing with the rack 43 is mounted on an output rotating shaft of the Y-axis servo motor 30. Thus, the bracket 29 is adapted to move in the Y-axis direction through the rotation of the pinion gear 31 and the meshing of the pinion gear 31 with the rack 43 as the Y-axis servo motor 30 is driven.

The scribe head 12 for forming the cut lines 3 on the unworked plate glass 2 and a marking head unit 33, i.e., a mark imparting device for applying alignment marks 85 onto the upper surface of the unworked plate glass 2 by a stamping method or an ink-jet method, are juxtaposed on a front surface 32 of the bracket 29. The scribe head 12 and the marking head unit 33 are adapted to integrally move in the Y-axis direction as the Y-axis servo motor 30 is driven.

The scribe head 12 includes a cutter wheel 34; a spline shaft 35 having the cutter wheel 34 at a lower end thereof; a spline unit 36 which is mounted on the bracket 29 and holds the spline shaft 35 movably in a vertical direction H perpendicular to an X-Y plane and rotatably in an R direction about an axis O thereof; and an air cylinder unit 37 having a cylinder rod connected to an upper end of the spline shaft 35 and mounted on the bracket 29. The cut line forming means 42 further includes, in addition to the scribe head 12, an angle-controlled rotating device 41 for rotating the spline shaft 35 under angular control so as to adjust a blade edge of the cutter wheel 34 in the direction of forming the cut line 3.

At the time of forming the cut line 3 onto the unworked plate glass 2 by the cutter wheel 34, the air cylinder unit 37, which moves the spline shaft 35 and, hence, the cutter wheel 34 up and down in the vertical direction H, is adapted to lower the cutter wheel 34 to press the unworked plate glass 2 by air pressure.

The angle-controlled rotating device 41 includes a driven gear 39 mounted on the spline shaft 35, a drive gear 40 meshing with the driven gear 39, and an angle controlling motor 38 which has an output rotating shaft with the drive gear 40 mounted thereon and is mounted on the bracket 29. The angle-controlled rotating device 41 is adapted to rotate the spline shaft 35 in the R direction about the axis O under angular control so as to adjust the blade edge of the cutter wheel 34 in the direction of forming the cut line 3.

The bend-breaking and separating device 6 has a belt conveyor device 50 onto which the unworked plate glass 2 having the cut lines 3 formed thereon and the alignment marks 85 applied to the regions of the respective unworked plate glasses 5 is adapted to be carried in. The belt conveyor device 50 has a conveyor belt 52 which planarly supports the carried-in unworked plate glass 2 and repeats forward feeding in the A direction and temporary stoppage of this feeding. In synchronism with the forward feeding and temporary stoppage of feeding by the conveyor belt 52, the bend-breaking and separating device 6 is adapted to sequentially cut out the unworked plate glasses 5 by bend-breaking and separating the unworked plate glass 2 along the cut lines 3, starting with the front end region.

The belt conveyor device 50 includes, in addition to the wide conveyor belt 52, a supporting base 53 for planarly supporting the conveyor belt 52 from the lower side, as well as a drive unit 54 for rotating the conveyor belt 52 in such a manner as to repeat the forward feeding of the planarly supported unworked plate glass 2 in the A direction and the temporary stoppage of this feeding.

The bend-breaking and separating device 6 has the bend-breaking and separating position 7 in a position 51 for effecting bend-breaking and separation, which is provided perpendicularly to the A direction in a downstream region of the belt conveyor device 50. In the bend-breaking and separating position 7, an opening 55 extending in the Y-axis direction perpendicular to the A direction, i.e., the transporting direction of the unworked plate glass 2, and an opening 57 extending in the A direction, i.e., the X-axis direction, in a central region of the Y-axis direction, are provided in the supporting base 53 for supporting the conveyor belt 52. A transverse bend-breaking roller 56 which moves in the vertical direction H is disposed in the opening 55, and a longitudinal bend-breaking roller 58 which moves in the vertical direction H is disposed in the opening 57.

Each of the pair of sucking and transporting devices 9 installed by being juxtaposed in series in the Y-axis direction above the bend-breaking and separating position 7 has a sucking and transporting shuttle 59, and each sucking and transporting shuttle 59 is adapted to reciprocate between the bend-breaking and separating position 7 and the position and angle correcting device 8 at the positioning position 16 in the Y-axis direction.

Each of the sucking and transporting devices 9 mounted on an upright stand 60 has a frame body 61 installed from above the bend-breaking and separating position 7 to above the positioning position 16. A pair of guide rails 62 are laid on upper surfaces of the frame bodies 61, and each of the sucking and transporting shuttles 59 is mounted on a slide block through a bracket 88, the slide block being fitted to the guide rails 62 movably in the Y-axis direction. Each of the sucking and transporting shuttles 59, which are linearly movable in the Y-axis direction while being guided by the corresponding guide rails 62, has a sucking and lifting device 63. Each sucking and lifting device 63 has a guide-type air cylinder unit 64 mounted on a front surface of the bracket 88, as well as a pair of suction pads 65 mounted on a vertically moving body of the guide-type air cylinder unit 64.

A ball screw 66 is rotatably mounted on each frame body 61 along the guide rails 62, and each ball screw 66 is threadedly engaged with a nut 68 attached to the bracket 88 and is hence connected to the bracket 88 through the nut 68, each ball screw 66 being coupled at one end thereof to an output rotating shaft of a shuttle moving motor 67.

Each shuttle moving motor 67 mounted at one end in the Y-axis direction of the frame body 61 is adapted to linearly move the sucking and transporting shuttle 59 under numerical control in the Y-axis direction through the nut 68 and the bracket 88 as the ball screw 66 is rotated by the numerically controlled driving of the shuttle moving motor 67. Each sucking and transporting shuttle 59 is adapted to suck and lift through the suction pads 65 the unworked plate glass 5 bend-broken and separated in the bend-breaking and separating position 7, suck and transport the unworked plate glass 5 to the positioning position 16, and release the suction on the upper surface of a rotary table 71 of the position and angle correcting device 8, to thereby place the unworked plate glass 5 on the upper surface of the rotary table 71.

The position and angle correcting device 8 and the two CCD cameras 10 installed above the position and angle correcting device 8 are disposed in each positioning position 16. Each position and angle correcting device 8 has the rotary table 71 on which the unworked plate glass 5 is placed and an angle controlling motor 70 for rotating the rotary table 71 under angular control about a central axis O2 perpendicular to the X-Y plane.

Each rotary table 71 is supported by a guide rail device 73 of a Y-axis table 72 through the angle controlling motor 70 and is adapted to be moved in the Y-axis direction by the numerically controlled driving of a Y-axis motor 74. The Y-axis table 72 is supported by a guide rail device 76 of an X-axis table 75 and is adapted to be moved in the X-axis direction by the numerically controlled driving of an X-axis motor 77. By means of these devices, each rotary table 71 is adapted to be moved under numerical control in the X-axis direction and the Y-axis direction of a work coordinate system in the positioning position 16, which correspond to the X-axis direction and the Y-axis direction of a work coordinate system in the cut line forming position 4a.

A work coordinate system identical to the work coordinate system set in the cut line forming device 4 in the cut line forming position 4a with respect to one unworked plate glass 5 is set in the positioning position 16 as well, and the two CCD cameras 10 in the positioning position 16 are installed such that central positions of imaging thereby are respectively disposed at positions in the work coordinate system set in the positioning position 16 (these positions being reference positions in the work coordinate system in the positioning position 16 with respect to the two alignment marks 85), which correspond to positions of the two alignment marks 85 set with respect to the unworked plate glass 5 in the work coordinate system of the cut line forming device 4 (these positions being coordinate values in the X-axis direction and the Y-axis direction in the work coordinate system set in the cut line forming device 4 in the cut line forming position 4a). The alignment marks 85 on the unworked plate glass 5 transported to the rotary table 71 are imaged and subjected to image processing, the amount of positional deviation from the reference position is calculated, and the amount of angular deviation of the unworked plate glass 5 is calculated from the amount of positional deviation.

The cut-out glass plate positioning apparatus 1 for effecting the cutting out of the unworked plate glasses 5 as the glass plates from the unworked plate glass 2 and the positioning of the unworked plate glasses 5 as the cut-out glass plates is comprised of the cut line forming device 4 having the scribe head 12 which moves in the X-Y coordinate plane along the plate surface of the unworked plate glass 2 so as to form the cut lines 3 on the unworked plate glass 2; the marking head unit 33, i.e., a mark imparting device, which, before cutting out the unworked plate glass 5, i.e., the cut-out glass plate, from the unworked plate glass 2 with the cut lines 3 formed thereon by the scribe head 12, applies the alignment mark 85 onto at least one location, i.e., two locations in this embodiment, in the region of the unworked plate glass 5 to be cut out; the bend-breaking and separating device 6, i.e., a cutting-out device, which cuts out the unworked plate glasses 5 from the unworked plate glass 2 along the cut lines 3 formed by the cut line forming device 4; the CCD camera 10 as a camera installed in the positioning position 16 for positioning the unworked plate glasses 5 cut out by the bend-breaking and separating device 6, by using as a reference position the mark coordinate values set in the work coordinate system set in the cut line forming device 4; and the position and angle correcting device 8 which detects the actual position of the alignment mark 85 by performing image processing of the alignment mark 85 imaged by the CCD camera 10, and calculates the amount of positional deviation between this detected actual position of the alignment mark 85 and the reference position of the alignment mark 85, to thereby correct the position and angle of the unworked plate glass 5 on the basis of this amount of positional deviation. In this cut-out glass plate positioning apparatus 1, the unworked plate glass 2 is carried in and placed on the belt conveyor table 11 by being positioned at a predetermined initial position in a preset work coordinate system in the cut line forming position 4a on the belt conveyor table 11, and when the unworked plate glass 2 is positioned and stopped at the set position in the work coordinate system in the cut line forming position 4a upon traveling on the belt conveyor table 11 under numerical control after being carried in and placed thereon, the scribe head 12 and the marking head unit 33 are integrally moved under numerical control on the basis of numerical information stored in advance for the cut-line formation of small divided unworked plate glasses. First, the cut lines 3 in the form of the multiplicity of unworked plate glasses 5 are formed on the upper surface of the unworked plate glass 2 by the operation of the scribe head 12. Subsequently the scribe head 12 and the marking head unit 33 are integrally moved under numerical control on the basis of the numerical information stored in advance for marking, and the two alignment marks 85 are applied to each unworked plate glass 5 by the operation of the marking head unit 33 which has been moved to the set two locations in the region of each unworked plate glass 5 with the cut lines formed on the upper surface of the unworked plate glass 2.

Furthermore, with the cut-out glass plate positioning apparatus 1, the unworked plate glass 2 for which the cut-line formation and marking have been completed is carried out from the belt conveyor table 11 by the traveling of the conveyor belt 13, and is carried in onto the upper surface of the conveyor belt 52 of the belt conveyor device 50 of the next bend-breaking and separating device 6. In the bend-breaking and separating device 6, the unworked plate glass 2 is planarly supported and is subjected to inching, which consists of a repetition of linear feeding in the A direction by the conveyor belt 52 and stoppage thereof. In such inching, when a front end region 87 of the unworked plate glass 2 reaches the bend-breaking and separating position 7 and the cut line 3 in the Y-axis direction reaches the transverse bend-breaking roller 56, the conveyor belt 52 is stopped, whereupon the suction pads 65 of the respective sucking and transporting shuttles 59 are lowered to suck the small divided unworked plate glass 5, and, simultaneously with this sucking, the transverse bend-breaking roller 56 and the longitudinal bend-breaking roller 58 are pushed upwardly to bend-break the unworked plate glass 2 at the cut lines 3 in the bend-breaking and separating position 7. The suction pads 65 which are sucking the unworked plate glass 5 in each sucking and transporting shuttle 59 are then raised, and this raising causes the unworked plate glass 5 being sucked by the suction pads 65 to be separated and cut out from the remaining unworked plate glass 2. Each sucking and transporting shuttle 59, while continuing to suck the cut-out unworked plate glass 5, sucks and transports the unworked plate glass 5 to the positioning position 16, and places that unworked plate glass 5 onto the rotary table 71. The alignment marks 85 at the two locations on the unworked plate glass 5 placed on the rotary table 71 are respectively imaged by the two CCD cameras 10 installed above, the picked-up image data is subjected to image processing and arithmetic processing, and the center actual positions of the two alignment marks 85 on the unworked plate glass 5 placed on the rotary table 71 and the angle of the unworked plate glass 5 are detected by this arithmetic processing, to thereby calculate the amount of positional deviation and the amount of angular deviation from the center reference positions of the alignment marks 85 and from reference angle concerning the X-axis direction and the Y-axis direction of the unworked plate glass 5, respectively. Each rotary table 71 is thus adapted to undergo angularly controlled rotation by the numerically controlled rotation of the angle controlling motor 70 as well as controlled movement in the X-axis direction and the Y-axis direction by the numerically controlled driving of the Y-axis motor 74 and the X-axis motor 77 so as to reduce the calculated amount of positional deviation and amount of angular deviation to zero, to thereby effect the positioning of the mounted unworked plate glasses 5.

The unworked plate glass 5 positioned by the position and angle correcting device 8 is lifted by a suction unit 92 of a transporting device 94 of the processing device 90 of the next stage, and is placed on a work table 93 of the processing device 90.

DESCRIPTION OF REFERENCE NUMERALS

1: cut-out glass plate positioning apparatus
2, 5: unworked plate glass

3: cut line
4: cut line forming device
6: bend-breaking and separating device
7: bend-breaking and separating position
8: position and angle correcting device
9: sucking and transporting device
10: CCD camera

The invention claimed is:

1. A method of cutting out a glass plate and positioning the cut-out glass plate, comprising:
    forming cut lines with a scribe head on an unworked plate glass with a preset work coordinate system in a cut line forming position with respect to the unworked plate glass;
    applying an alignment mark onto at least two locations set in advance in the preset work coordinate system on each of a plurality of glass plates to be cut out from the unworked plate glass, before forming the plurality of cut-out glass plates cut out from the unworked plate glass along the cut lines;
    detecting a position of an actual alignment mark on the cut-out glass plate by performing imaging and image processing of the alignment mark with a camera installed by setting as a reference position a coordinate value of the alignment mark set in the preset work coordinate system, in a positioning position for positioning the glass plate with the alignment mark applied thereto and cut out;
    calculating an amount of positional deviation between the position of the actual alignment mark and the reference position; and
    correcting a position and an angle of the cut-out glass plate on the basis of the amount of positional deviation, using a position and angle correcting device.

2. A method of cutting out a glass plate and positioning the cut-out glass plate, comprising:
    forming cut lines with a scribe head on an unworked plate glass by moving the scribe head under numerical control along a glass plate surface of the unworked plate glass in an X-Y coordinate plane in a preset work coordinate system;
    applying an alignment mark onto at least two locations set in the preset work coordinate system on each of a plurality of glass plates to be cut out from the unworked plate glass, before forming the plurality of cut-out glass plates cut out from the unworked plate glass along the cut lines;
    detecting a position of an actual alignment mark on the cut-out glass plate by performing imaging and image processing of the alignment mark by a camera installed by setting as a reference position a coordinate value of the alignment mark set in the preset work coordinate system, in a positioning position for positioning the glass plate with the alignment mark applied thereto and cut out;
    calculating an amount of positional deviation in an X-Y plane between the position of the actual alignment mark and the reference position; and
    correcting a position and an angle of the cut-out glass plate in the X-Y plane on the basis of the amount of positional deviation using a position and angle correcting device.

3. A method of cutting out a glass plate and positioning the cut-out glass plate, comprising:
    forming cut lines with a scribe head on an unworked plate glass with a preset work coordinate system in a cut line forming position with respect to the unworked plate glass;
    applying an alignment mark onto at least one location set in advance in the preset work coordinate system on each of a plurality of glass plates to be cut out from the unworked plate glass, before forming the plurality of cut-out glass plates cut out from the unworked plate glass along the cut lines;
    detecting an actual alignment mark on the cut-out glass plate by performing imaging and image processing of the alignment mark with a camera installed by setting as a reference position a coordinate value of the alignment mark set in the work coordinate system, in a positioning position for positioning the glass plate with the alignment mark applied thereto and cut out; and
    correcting a position and an angle of the cut-out glass plate on the basis of the position and form of the detected actual alignment mark and the reference position and the form of the applied alignment mark, using a position and angle correcting device.

4. An apparatus for effecting cutting out of a glass plate and positioning of the cut-out glass plate, comprising:
    a cut line forming device having a scribe head which moves in an X-Y coordinate plane along a plate surface of an unworked plate glass so as to form cut lines on the unworked plate glass;
    a mark imparting device which, before cutting out a plurality of cut-out glass plates from the unworked plate glass with the cut lines formed thereon by the scribe head, applies an alignment mark onto at least two locations in a region of each of a plurality of glass plates to be cut out;
    a cutting-out device which cuts out the plurality of cut-out glass plates from the plurality of glass plates to be cut out each of which the alignment mark is applied thereto along the cut lines formed by the cut line forming device;
    a camera installed in a positioning position for positioning each of the plurality of cut-out glass plates cut out by the cutting-out device, by using as a reference position a mark coordinate value set in a work coordinate system set in the cut line forming device;
    a processor configured to detect a position of an actual alignment mark by performing image processing of the alignment mark imaged by the camera, and to calculate an amount of positional deviation between the detected position of the actual alignment mark and a reference position of the alignment mark; and
    a position and angle correcting device configured to correct the position and angle of each of the plurality of cut-out glass plates on the basis of the amount of positional deviation.

5. An apparatus for effecting cutting out of a glass plate and positioning of the cut-out glass plate, comprising:
    a cut line forming device having a scribe head which moves in an X-Y coordinate plane along a plate surface of an unworked plate glass so as to form cut lines on the unworked plate glass;
    a mark imparting device which, before cutting out a plurality of cut-out glass plates from the unworked plate glass with the cut lines formed thereon by the scribe head, applies an alignment mark onto at least one location in a region of each of a plurality of glass plates to be cut out;

a cutting-out device which cuts out the plurality of cut-out glass plates from the plurality of glass plates to be cut out each of which the alignment mark is applied thereto along the cut lines formed by the cut line forming device;

a camera installed in a positioning position for positioning each of the plurality of cut-out glass plates cut out by the cutting-out device, by using as a reference position a mark coordinate value specified in a work coordinate system set in the cut line forming device;

a processor configured to detect a position of an actual alignment mark by performing image processing of the alignment mark imaged by the camera, and to calculate an amount of positional deviation between the detected position of the actual alignment mark and a reference position of the alignment mark; and a position and angle correcting device configured to correct the position and angle of each of the plurality of cut-out glass plates on the basis of the amount of positional deviation.

* * * * *